United States Patent [19]
Minegishi

[11] Patent Number: 6,072,988
[45] Date of Patent: Jun. 6, 2000

[54] MOBILE COMMUNICATION SYSTEM CAPABLE OF PROMPTLY ALLOCATING OPTIMUM TRAFFIC CHANNELS

[75] Inventor: Yoshikazu Minegishi, Kanagawa, Japan

[73] Assignee: NEC Corporation, Tokyo, Japan

[21] Appl. No.: 09/010,549

[22] Filed: Jan. 22, 1998

[30] Foreign Application Priority Data

Jan. 22, 1997 [JP] Japan .................................... 9-009252

[51] Int. Cl.[7] .................................................. H04B 17/00
[52] U.S. Cl. ........................... 455/62; 455/450; 455/452; 455/509; 455/512; 455/513
[58] Field of Search ........................... 455/62, 63, 166.1, 455/166.2, 450, 451, 452, 455, 509, 510, 512, 513, 516; 370/329, 332, 333

[56] References Cited

U.S. PATENT DOCUMENTS

| 5,197,093 | 3/1993 | Knuth et al. ......................... 455/161.1 |
| 5,263,176 | 11/1993 | Kojima et al. ............................ 455/62 |
| 5,276,908 | 1/1994 | Koohgoli et al. ......................... 455/62 |

FOREIGN PATENT DOCUMENTS

| 2-166927 | 6/1990 | Japan . |
| 3-49394 | 3/1991 | Japan . |
| 4-273622 | 9/1992 | Japan . |
| 7-222244 | 8/1995 | Japan . |
| 7-107544 | 4/1999 | Japan . |

*Primary Examiner*—Lee Nguyen
*Attorney, Agent, or Firm*—Sughrue, Mion, Zinn, Macpeak & Seas, PLLC

[57] ABSTRACT

In a mobile communication system comprising a control station, a plurality of base stations each for defining a service area, and a plurality of mobile stations, in a standby mode, each of the mobile stations monitors reception levels and interference levels of traffic channels from the base stations and transmits first priority lists of traffic channels via the base stations to the control station. Also, the control station renews and stores second priority lists of traffic channels for the base stations in accordance with first priority lists of traffic channels from the base stations and further transmits these second priority lists to the base stations upon receipt of a request for call connection. In a call connection mode, each of the base stations allocate optimum traffic channels to the mobile stations under the control of each of the base stations in accordance with one of the second priority lists of traffic channels.

11 Claims, 6 Drawing Sheets

$f_1$ $f_2$ $f_3$ $f_4$ $f_5$

⋮

C : SIGNAL CHANNEL
S : TRAFFIC CHANNELS

MOBILE COMMUNICATION SYSTEM CAPABLE OF PROMPTLY ALLOCATING OPTIMUM TRAFFIC CHANNELS

BACKGROUND OF THE INVENTION

1. Field of the Invention

The present invention relates to a mobile communication system, and more particularly, to a private communication system.

2. Description of the Related Art

In a prior art mobile communication system, when a mobile station requests a call connection to a base station, the base station transmits a list of available traffic channels, using a signal channel to the mobile station. Then, the mobile station checks the available traffic channels and selects one of the available traffic channels which has a least amount of interference with the traffic channels of other base stations. The mobile station the transmits the selected traffic channel to the base station using the signal channel. Thus, a call connection is carried out for the mobile station (see JP-A-7-107544).

In the above-described prior art mobile communication system, however, since traffic channels are checked and one of the traffic channels is selected upon receipt of a call connection request from a mobile station, it takes a long time to allocate an optimum traffic channel to the mobile station.

SUMMARY OF THE INVENTION

It is an object of the present invention to provide a mobile communication system capable of promptly allocating optimum traffic channels to mobile stations.

According to the present invention, in a mobile communication system including a control station, a plurality of base stations each for defining a service area, and a plurality of mobile stations, in a standby mode, each of the mobile stations monitors reception levels and interference levels of traffic channels from the base stations and transmits first priority lists of traffic channels via the base stations to the control station. Also, the control station renews and stores second priority lists of traffic channels for the base stations in accordance with first priority lists of traffic channels from the base stations. In a call connection mode, each of the base stations allocates optimum traffic channels to the mobile stations under the control of each of the base stations in accordance with one of the second priority lists of traffic channels.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
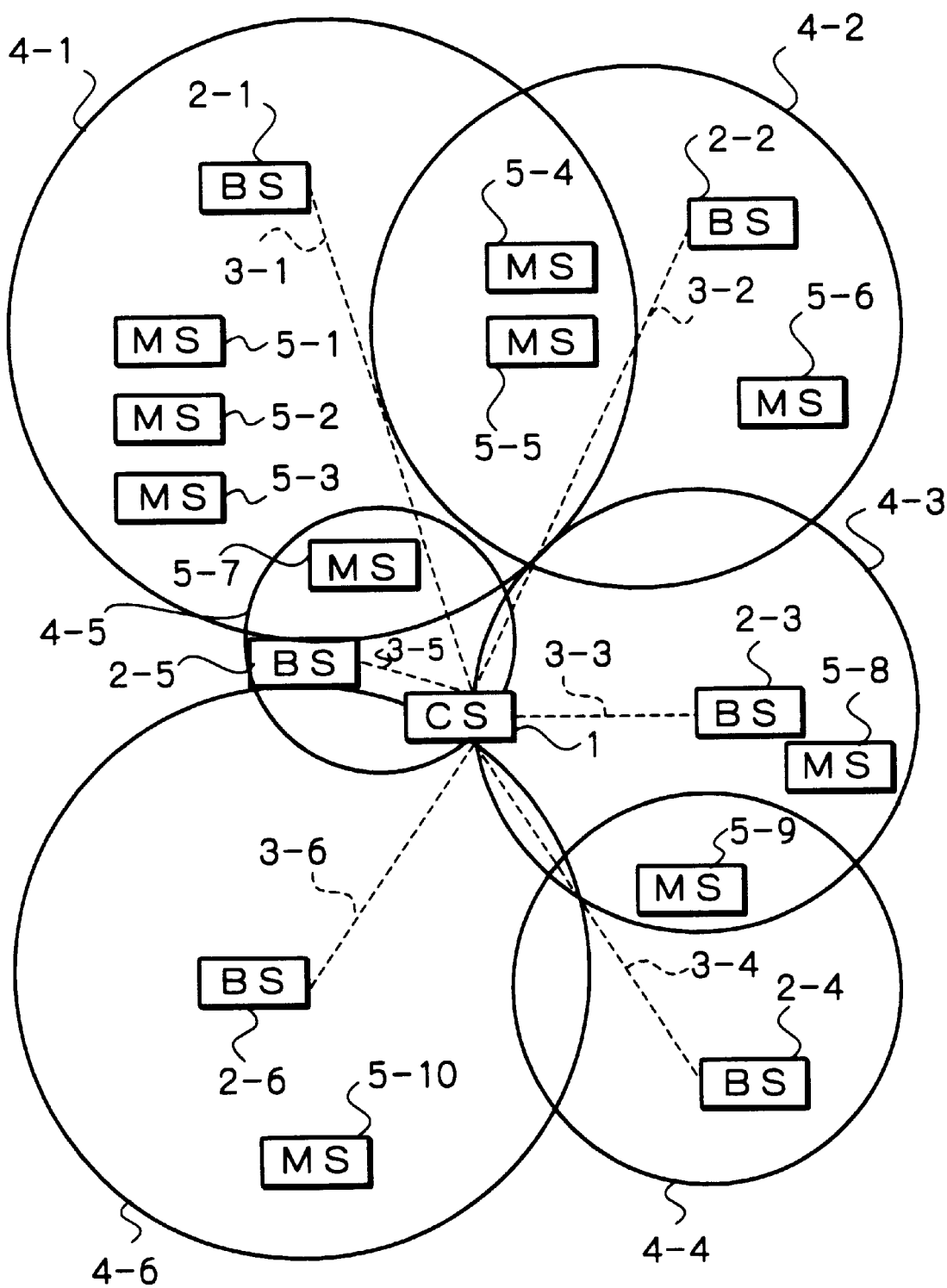
FIG. 1 is a diagram illustrating an embodiment of the mobile communication system according to the present invention.

In FIG. 1, which illustrates a representative embodiment of the mobile communication system according to the present invention, reference numeral 1 designates a control station including a switching network for carrying out a call connection for a public switched telephone network (PSTN) and a call distribution connection control for base stations 2-1, 2-2, . . . , 2-6.

The base stations 2-1, 2-2, . . . , 2-6 are connected by control lines 3-1, 3-2, . . . , 3-6 to the control station 1.

The base stations 2-1, 2-2, . . . , 2-6 have service areas 4-1, 4-2, . . . , 4-6, respectively.

Reference numerals 5-1, 5-2, . . . , 5-10 designate mobile stations. The mobile stations 5-1, 5-2, 5-3, 5-4, 5-5 and 5-7 are located within the service area 4-1 of the base station 2-1, and the mobile stations 5-4, 5-5 and 56 are located within the service area 4-2 of the base station 2-2. Also, the mobile stations 5-8 and 5-9 are located with the service area 4-3 of the base station 2-3, and the mobile station 5-9 is located within the service area 4-4 of the base station 2-4. Further, the mobile station 5-7 is located within the service area 4-5 of the base station 2-5, and the mobile station 5-10 is located within the service area 4-6 of the base station 2-6. In this case, the mobile stations 5-4 and 5-5 can receive services from both of the base stations 2-1 and 2-2. Also, the mobile station 5-9 can receive services from both of the base stations 2-3 and 2-4. Further, the mobile station 5-7 can receive services from both of the base stations 2-1 and 2-5.

Figure 2:
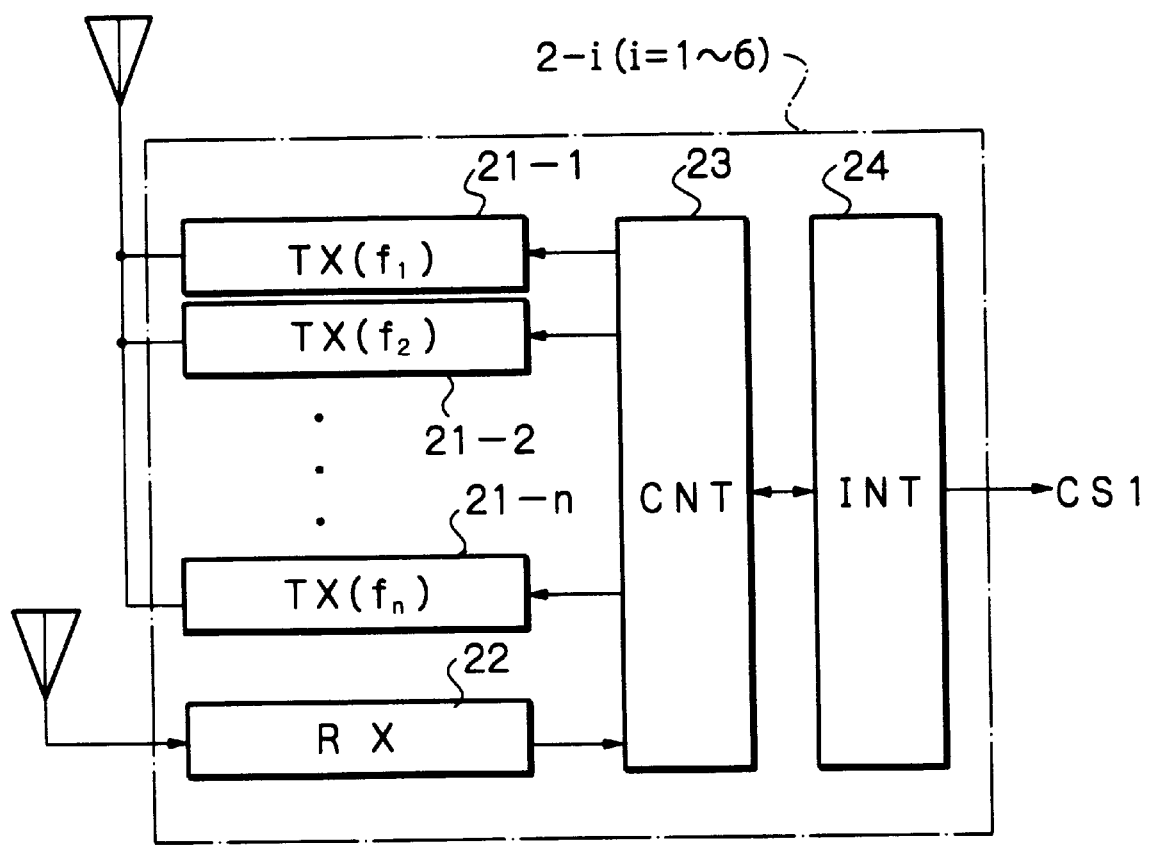
FIG. 2 is a detailed block circuit diagram of the base station of FIG. 1.

In FIG. 2, which is a detailed circuit diagram of the base station 2-i of FIG. 1, the base station 2-i is constructed by a plurality of transmitter circuits 21-1, 21-2, . . . , 21-n each for generating a carrier of a predetermined frequency such as fl, a receiver unit 22, a control circuit 23 formed by a microprocessor and a memory, and an interface with the control station 1. Note that the combination of the transmitter units 21-1, 21-2, . . . , 21-n can be different in accordance with the base stations 2-1, 2-2, . . . , 2-6.

Figure 3:
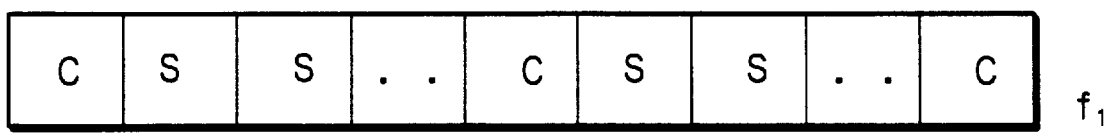
FIG. 3 is a timing diagram showing channels of the base station during digital communication of FIG. 1.
Figure 3:
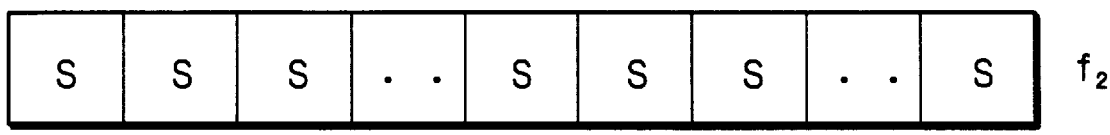
Figure 3:
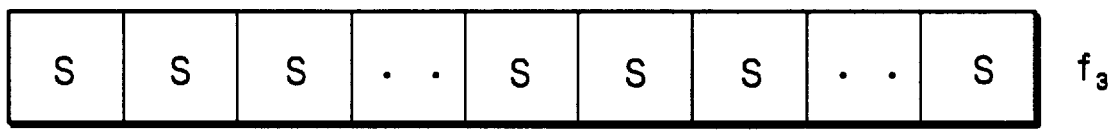
Figure 3:
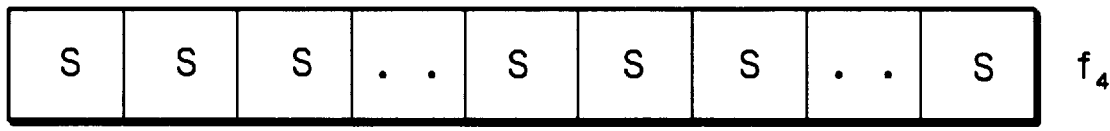
Figure 3:
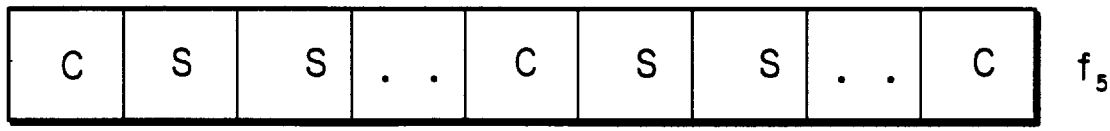

In the case of an analog communication, a signal channel is allocated to one frequency corresponding to one of the transmitter units 21-1, 21-2, . . . , 21-n, and traffic channels are allocated to the frequencies corresponding to the other transmitter units. On the other hand, in a digital communication, as shown in FIG. 3, a signal channel is allocated to special time slots of one or more frequencies corresponding to one or more of the transmitter units 21-1, 21-2, . . . , 21-n, and traffic channels are allocated to the other time slots.

Figure 4:
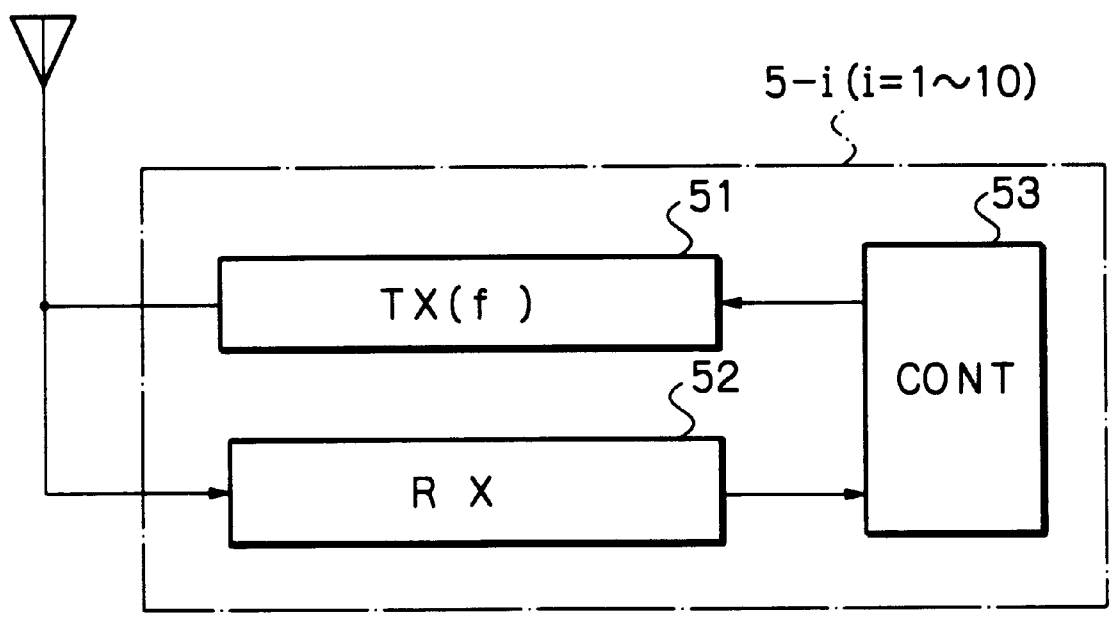
FIG. 4 is a detailed block circuit diagram of the mobile station of FIG. 1.

In FIG. 4, which is a detailed circuit diagram of the mobile station 5-i of FIG. 1, the mobile station 5-i is constructed by a transmitter circuit 51, a receiver unit 52, and a control circuit 53 formed by a microprocessor and a memory.

The operation of the control station 1, the base station 2-1 and the mobile stations 5-1, 5-2, . . . will be explained next with reference to FIGS. 5 and 6. Note that FIG. 5 is a sequence diagram of a standby operation of the base station 2-1 and the mobile stations, and FIG. 6 is a sequence diagram of a call connection operation of the mobile stations.

Figure 5:
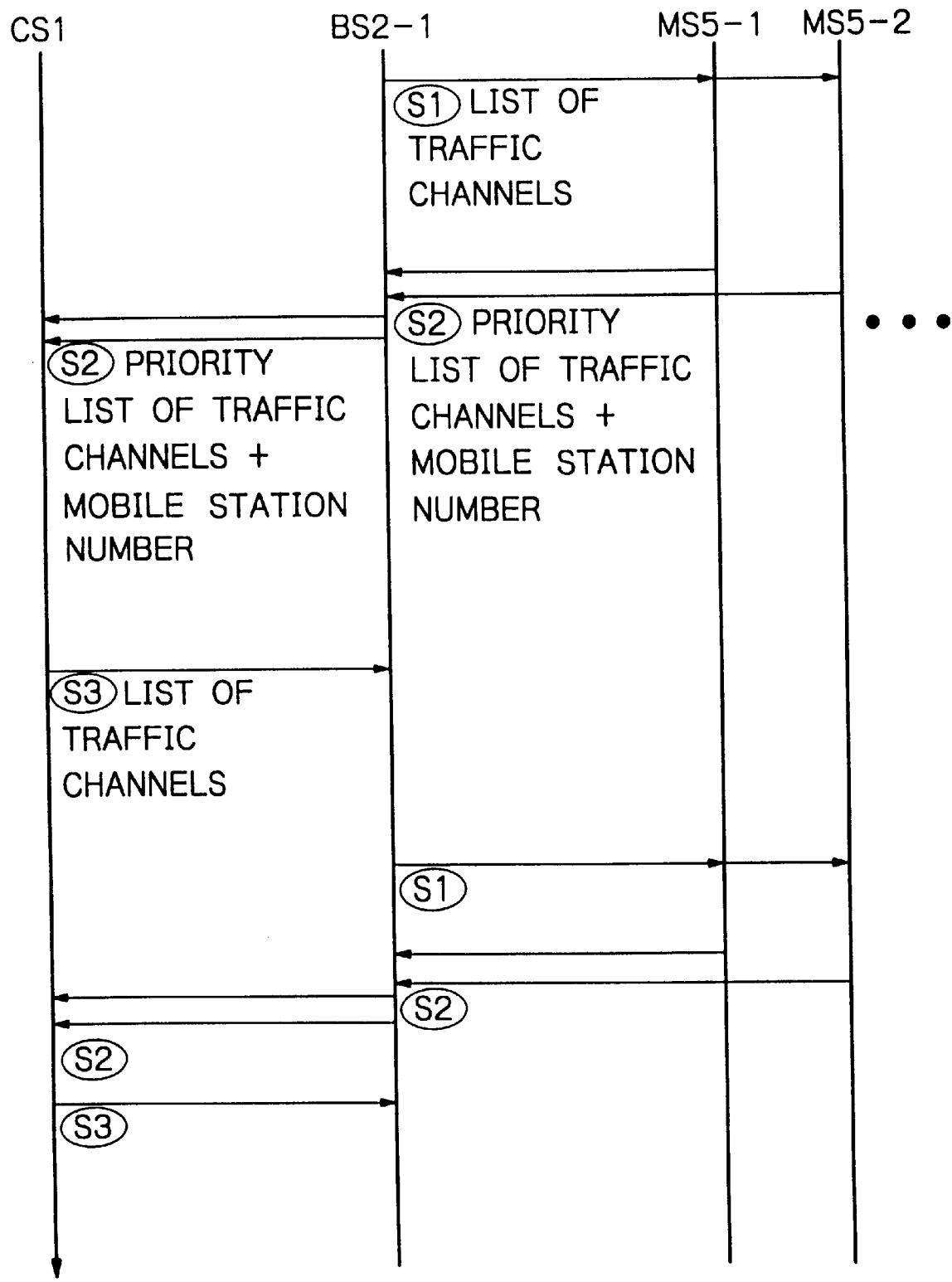
FIGS. 5 and 6 are sequence diagrams showing the operation of the mobile communication system of FIG. 1.
Figure 6:
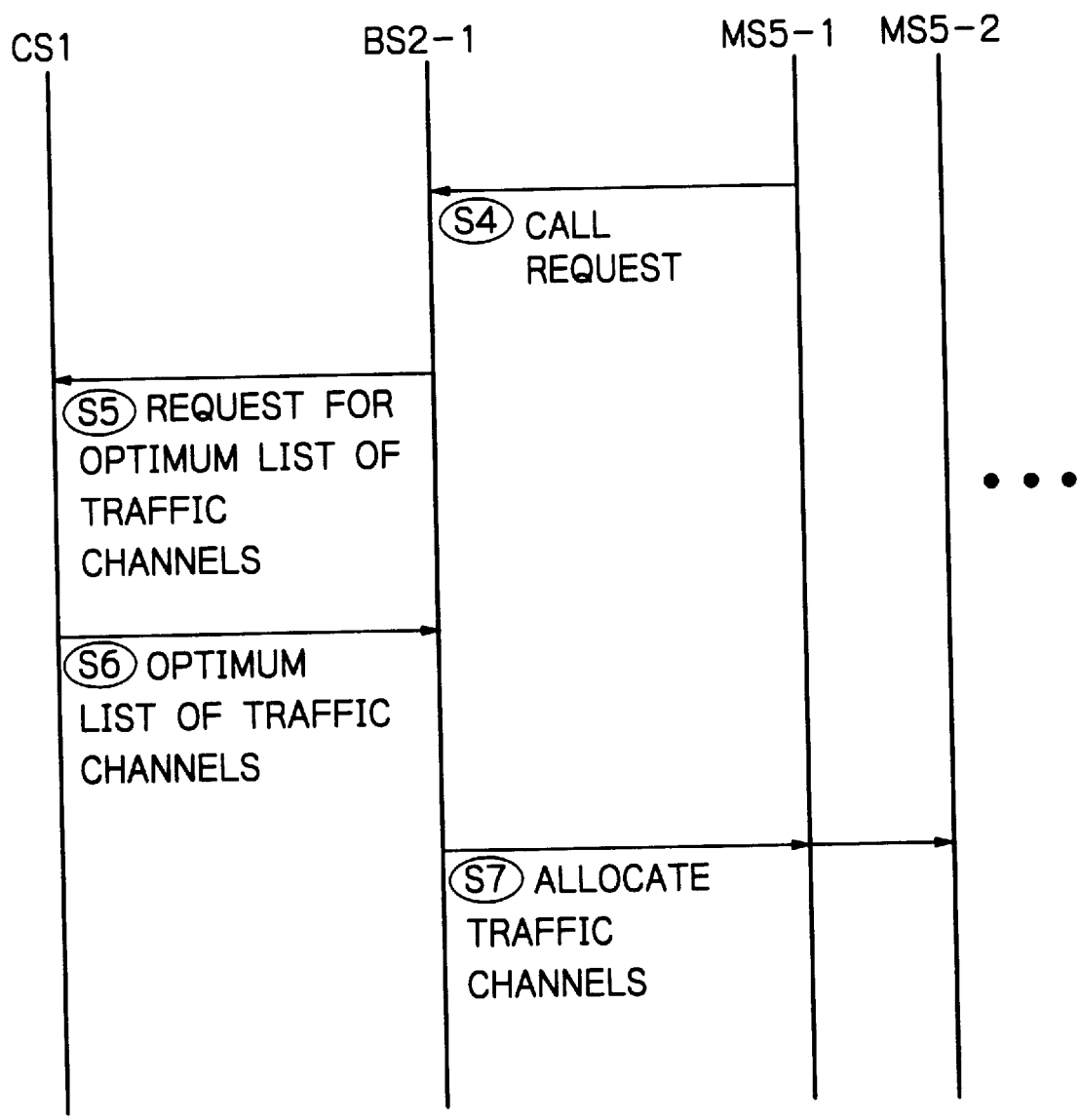

In FIG. 5, the base station 2-1 transmits a traffic channel list S1 by using the signal channel to all the mobile stations, such as 5-1, 5-2, . . . , located within the service area 4-1 of the base station 2-1. In this case, the traffic channel list S1 includes traffic channels which are considered to have small interferences with the traffic channels of the other base stations 2-2, 2-3, . . . .

As a result, each of the mobile stations 5-1, 5-2, . . . under the control of the base station 2-1 monitors the reception levels of the traffic channels in the list S1 to determine whether or not each of the reception levels is higher than a predetermined level. Then, each of the mobile stations 5-1, 5-2, . . . selects traffic channels whose reception levels are higher than the predetermined level. Then, each of the mobile stations 5-1, 5-2, . . . calculates the interference levels of the selected traffic channels with the corresponding traffic channels of the other base stations 2-2, 2-3, . . . , so that a priority sequence is given to the selected traffic channels.

Next, each of the mobile stations 5-1, 5-2, . . . under the control of the base station 2-1 transmits a priority list S2 of the selected traffic channels along with the mobile station number by using the signal channel to the base station 2-1. Further, the base station 2-1 transmits all the priority lists S2 along with the mobile station numbers to the control station 1" using the control line 3-1.

As a result, the control station 1 records all the priority lists received from the base station 2-1, and renews one priority list of traffic channels for the base station 2-1.

Next, the control station 1 transmits the renewed priority list S3 of traffic channels by using the control line 3-1 to the base station 2-1.

Next, the base station 2-1 transmits a traffic channel list S1 in accordance with the renewed priority list S3 of traffic channels to the mobile stations 5-1, 5-2, . . . under the control of the base station 2-1, thus repeating the above-described operation.

In FIG. 6, when the mobile station 5-1 requests a call connection S4 by using the signal channel for the base station 2-1, the base station 2-1 processes the call connection S4 and recognizes the mobile station 5-1.

Next, the base station 2-1 transmits a request S5 for an optimum list of traffic channels for the mobile stations 5-1, 5-2, . . . under the control of the base station 2-1 by using the control line 3-1 to the control station 1.

Next, the base station 2-1 receives an optimum list S6 of traffic channels from the memory of the control station 1, and as a result, the base station 2-1 allocates optimum traffic channels S7 to the mobile stations 5-1, 5-2, . . . under the control of the base station 2-1.

Note that, if the mobile communication system is a private communication where a communication service is possible between the service areas 4-1, 4-2, . . . under the control of the control station 1, different traffic channels are allocated to one mobile station by the base stations 2-1, 2-2, . . . , which creates no problem.

As explained hereinabove, according to the present invention, since an optimum list of traffic channels are realized in a standby mode, the optimum traffic channels can be allocated to mobile stations immediately upon receipt of a call request of one of the mobile stations.

I claim:

1. A mobile communication system comprising:
   a control station;
   a plurality of base stations, connected to said control station, each for defining a service area; and
   a plurality of mobile stations,
   said mobile stations comprising means for monitoring reception levels and interference levels of traffic channels from said base stations and transmitting first priority lists of traffic channels via said base stations to said control station in a standby mode,
   said control station comprising means for renewing and storing second priority lists of traffic channels for said base stations in accordance with said first priority lists of traffic channels from said base stations and transmitting said second priority lists to base stations in response to a request for call connection
   each of said base stations comprising means for allocating optimum traffic channels to said mobile stations, each of said plurality of mobile stations being under control of one or more respective base stations upon receipt of a call connection request from one of said mobile stations.

2. The system of claim 1, wherein mobile stations may be allocated to two or more service areas, said service areas being defined by different base stations, wherein said optimum traffic channels are allocated by all of said different base stations to said mobile stations during a call connection request.

3. The system of claim 1, wherein said base station comprises:
   a plurality of transmitter circuits;
   a receiver unit;
   a control circuit, formed by a microprocessor and a memory;
   and, an interface with the control station.

4. The system of claim 3, wherein each of said plurality of transmitter circuits generates a carrier of predetermined frequency.

5. The system of claim 4, wherein a combination of transmitter units can be different in accordance with said base stations.

6. The system of claim 1, wherein said mobile stations may be located in two or more service areas, said service areas being defined by different base stations of said plurality of base stations.

7. The system of claim 1, wherein the mobile stations include means for monitoring reception levels and interference levels of traffic channels on an ongoing basis during standby mode.

8. A method for allocating traffic channels to mobile stations in a mobile communication system including a plurality of base stations connected to a control station, comprising the steps of:
   transmitting a list of traffic channels from one of said base stations to said mobile stations in a standby mode;
   forming first priority lists of traffic channels in said mobile stations by checking reception levels and interference levels of said list of traffic channels;
   transmitting said first priority lists of traffic channels from said mobile stations via said base stations to said control station;
   recording said first priority lists of traffic channels and renewing second priority lists of traffic channels for each of said base stations by said control station;
   repeating said traffic channel list transmitting steps by replacing said traffic channel list with one of said second priority lists of traffic channels in a standby mode;
   receiving a call connection request from one of said mobile stations received by one of said base stations;
   requesting an optimum list of traffic channels from said control station by one of said base stations following a call connection request;
   transmitting said optimum list of traffic channels based upon one of said second priority list of traffic channels from said control station to said one of said base stations in call connection mode; and
   allocating said optimum list of traffic channels to said mobile stations from said one of said base stations.

9. The method of claim 8, wherein mobile stations may be allocated to two or more service areas, said service areas being defined by different base stations, wherein said optimum traffic channels are allocated by all of said different base stations to said mobile stations during said call connection request.

10. The method of claim 8, for analog communication, wherein traffic channel lists are transmitted via a signal channel allocated to one frequency.

11. The method of claim 8, for digital communication, wherein a signal channel is allocated to special time slots of one or more frequencies.

* * * * *

UNITED STATES PATENT AND TRADEMARK OFFICE
CERTIFICATE OF CORRECTION

PATENT NO.: 6,072,988
DATED: June 6, 2000
INVENTOR(S): MINEGISHI, Yoshikazu

It is certified that error(s) appears in the above-identified patent and that said Letters Patent is hereby corrected as shown below:

Column 2, line 13, delete "56" insert --5-6--.

line 29, delete "f1" insert --$f_1$--.

Signed and Sealed this

Seventeenth Day of April, 2001

*Attest:*

NICHOLAS P. GODICI

*Attesting Officer*    Acting Director of the United States Patent and Trademark Office